Figure 1:
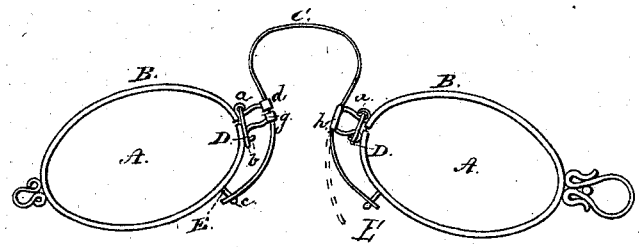
Figure 2:
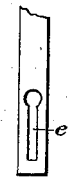

A. FRICKE.
Eye-Glass Frames.

No. 150,557. Patented May 5, 1874.

Attest,
J. C. Hubbell
H. N. Jenkins

Inventor,
A. Fricke

UNITED STATES PATENT OFFICE.

ANDREW FRICKE, OF NEW ORLEANS, LOUISIANA.

IMPROVEMENT IN EYEGLASS-FRAMES.

Specification forming part of Letters Patent No. 150,557, dated May 5, 1874; application filed August 20, 1873.

*To all whom it may concern:*

Be it known that I, ANDREW FRICKE, of the city of New Orleans, parish of Orleans and State of Louisiana, have made certain new and useful Improvements in Spectacle and Eyeglass Frames; and I hereby declare the following to be a full, clear, and correct description of the same, reference being had to the accompanying drawing constituting a part of this specification.

My improvement relates, first, to a simple but efficient means through the agency of which I am enabled readily and easily to open the glass-frame, so as with facility to insert the glass therein, to permanently secure and retain the same therein when thus placed, while at the same time I am enabled, in the shortest possible time and with the greatest facility, to remove the said glass therefrom, for the purpose of substituting another glass therefor, for cleaning, or for any other purpose whatever. The second part of my improvement relates to the adjustability of the connecting-spring to noses the "bridges" of which are of different degrees of width or thickness.

For the reasons above stated, and from experience in the use of my improvement, it is rendered exceedingly valuable, not only to the manufacturer of spectacle and eyeglass frames, but to the public as well.

My invention, its construction and operations, will now be more clearly understood by reference to the drawing, whereon it is clearly shown, and whereon the similar letters of reference indicate corresponding parts of the same device.

A are the glasses, and B the exterior frames thereof, while C is the connecting "bridge-spring." D are links, by means of which the two sides of the said frames B are held more securely together when the glasses are inserted therein than they could possibly be held by the spring-power of the two sides of the frames alone, and without the intervention of the said links. The said links D are held in position by the eyes $a$, and, when slipped over the catches $b$, these firmly and securely hold the two sides of the frames B together, so that by no possibility can the glasses slip therefrom, while at the same time these links are easily raised from the said catches $b$, whereupon the said sides of the said frames B will readily open outward, and as a consequence the glasses may be easily removed therefrom. E are small pins secured to the sides of the frames B, and are provided with small heads $c$, over which the two ends of the said connecting "bridge-springs" are placed, through small elongated openings therein provided. The said spring is likewise passed through slots $d$ made within the extreme inner or proximate ends of the glass-frames, as plainly shown. By slipping the said ends of the said springs from the heads of the said pins E, it will plainly be perceived that the said springs C may then be drawn from the said slots $d$, and the spring and glasses are separated; or one of the glasses may be removed therefrom, while the other remains attached to the said spring C. For the purposes of widening or contracting the space between the proximate ends of the glass-frames, to the end of adjusting the spring to noses the "bridges" of which are of different degrees of width or thickness, the said pins E may be simply bent forward or backward to an extent limited only by their lengths, and the result above stated will be effectually accomplished. The proximate ends of the glass frames may be cut open, as shown at $g$, or not so cut, as shown at $h$, as may be desired, or as found most expedient.

Having described my invention, its construction and mode of operation, what I claim as new, and desire to secure by Letters Patent, is—

1. The spectacle or eyeglass frame B, divided crosswise at one end for the insertion and removal of the glass, and fastened by the link D, substantially as described.

2. The spectacle-frames B B, provided with pins E E, and connected by bridge-spring C, having loop-hole slots in its ends, which fit over the heads of the pins E E, substantially as described, and for the purpose specified.

A. FRICKE.

Witnesses:
H. N. JENKINS,
J. C. HUBBELL.